March 31, 1925.
T. BOSSHARD
1,532,031
CANDY SPINNING AND WEAVING MACHINE
Filed Aug. 21, 1923
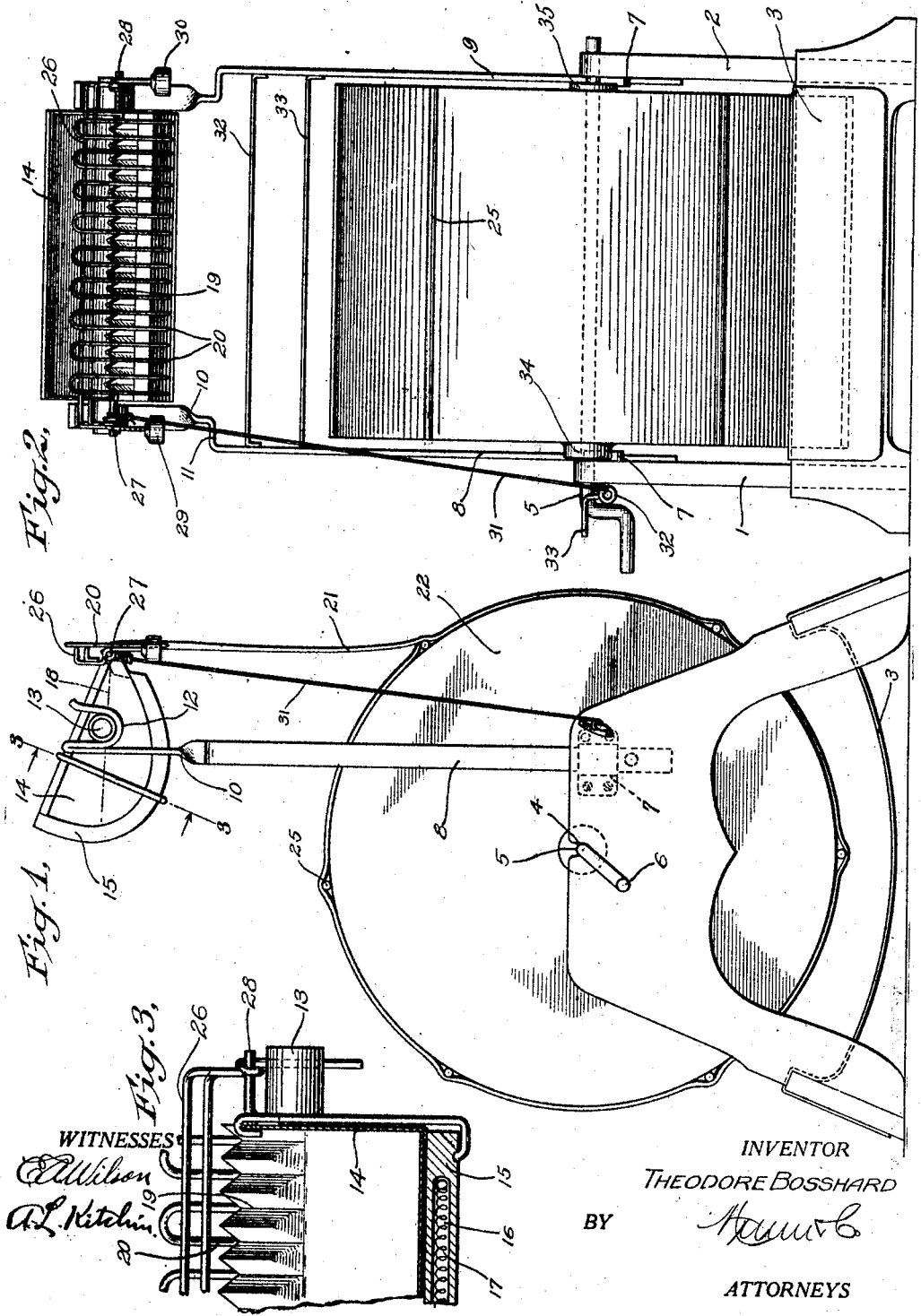
INVENTOR
THEODORE BOSSHARD
BY
ATTORNEYS Patented Mar. 31, 1925.

1,532,031

UNITED STATES PATENT OFFICE.

THEODORE BOSSHARD, OF BROOKLYN, NEW YORK.

CANDY SPINNING AND WEAVING MACHINE.

Application filed August 21, 1923. Serial No. 658,617.

*To all whom it may concern:*

Be it known that I, THEODORE BOSSHARD, a citizen of the United States, and a resident of the city of New York, borough of Brooklyn, in the county of Kings and State of New York, have invented a new and Improved Candy Spinning and Weaving Machine, of which the following is a full, clear, and exact description.

This invention relates to candy making machines and particularly to an improved machine for spinning and weaving candy.

The object of the invention is to provide a simplified construction for working candy to produce quickly a candy having a fine quality from a prepared batch of syrup.

Another object of the invention is to provide a simple and easily operated machine which will simultaneously spin and weave the candy into the desired consistency.

A still further object is to provide a candy spinning and weaving apparatus which automatically maintains the liquid candy in the proper liquid condition until it passes to the spinning and weaving stage.

In the accompanying drawing—

Figure 1 is a side view of a candy spinning and weaving apparatus disclosing an embodiment of the invention.

Figure 2 is a front view of the structure shown in Figure 1.

Figure 3 is a sectional view through Figure 1, approximately on line 3—3, the same being on an enlarged scale.

Referring to the accompanying drawing by numerals, 1 and 2 indicate standards which may be of any material and connected together in any suitable manner, said standards preferably carrying a guarding sheet 3 to catch any accidental drip from the parts arranged thereabove. Each of the standards is provided with a notch 4 for receiving the shaft 5, which shaft is provided with a manually actuated crank 6 at one end. Each standard is also provided with a socket member 7 secured in place by screws or other suitable means, said socket members accommodating the brackets 8 and 9, which brackets are constructed as shown in Figure 1. Each of the brackets is provided with a bend 10, a horizontal section 11 and a socket portion 12, said socket portion receiving the stub shafts 13 projecting from the pan or receptacle 14. This pan or receptacle may be made from metal or any desired material and is connected in any suitable manner with the heat resisting member 15, which heat resisting member is provided with cavities 16 carrying electric heating coils 17, said coils being connected to any suitable supply of electricity whereby they may be charged to any desired extent to maintain the container 14 heated and also to maintain the contents 18 heated to the desired extent so that it will readily flow as hereinafter fully described. The container 14 is provided with a number of discharge spouts 19 which are grouped together as shown in Figure 2, said spouts forming V-shaped discharge members.

When the container 14 is tilted to the position shown in Figure 1 or tilted to a greater extent, some of its contents will be discharged out through the various spouts 19 and will strike the various fingers 20 as the discharge is directly against these fingers. Preferably, these fingers contact slightly with the spouts 19 though this is not essential. As the material 18 passes along the fingers 20 it will run off in a stream 21 as shown in Figure 1 and becomes deposited on the weaving drum 22 which is rotated by the crank 6. This drum is provided with bars 25 which form abutments to prevent the candy from slipping on the drum. As the drum is rotated, it is also moved transversely or longitudinally of the shaft 5 manually whereby the various streams 21 may be woven to any desired extent, the discharging of the streams from the fingers 20 producing a spinning action. The fingers 20 are carried by one or more bars 26 which have suitable extensions pivotally mounted on the pins 27 and 28 projecting from the container 14. Suitable weights 29 and 30 are also secured to the bars 26 and swing therewith on the pins 27 and 28 so as to maintain the fingers 20 always in a substantially vertical position.

When the container 14 is full, it is substantially in the position shown in Figure 1 but as the material 18 is fed therefrom it is necessary to tilt the container more and more. This tilting action is caused by having a rod or ligament 31 connected to the container 14 at any suitable point, as for instance, on the pin 27. This ligament is connected also with a small shaft 32 carrying a crank 33. This crank is rotated as desired to cause a more or less tilting action of the container 14. Preferably the container 14 is of sufficient capacity to provide the desired thickness of woven candy on the drum 22 whereby when the container is empty it is then necessary to remove the candy from the container 22 which is done by cutting the band of candy at one point and then stripping the same from the drum or by sliding the candy off of the drum laterally.

It is, of course, evident that more than one container full of candy might be deposited on the drum 22 though ordinarily this is not the case. After the first batch of candy has been stripped from the drum 22, it is in condition for a second operation and as many operations may be had as desired. In the accompanying drawing, the drum 22 has been shown as operated by hand but it is evident that the same may be operated by power if desired without departing from the spirit of the invention.

The container 14 has been described as being heated by the electric heating coils 17 but it is to be understood that other heating means might be provided without departing from the spirit of the invention, as for instance, gas or other burners. If desired, these burners could be supported by a bracing bar 32 or 33, which bars act to brace and stiffen the brackets 8 and 9. Also in the accompanying drawing, a comparatively thick washer 34 has been provided on shaft 5 near one end and a comparatively thin washer 35 has been provided at the opposite end whereby the drum is held in proper position normally whereby a lateral movement may be secured at any time to cause a more or less weaving action as the liquid candy is deposited on the drum. It is also evident that other slight changes might be made in various parts of the device without departing from the spirit of the invention.

What I claim is:—

1. A candy spinning and weaving machine, comprising a drum, means for rotating said drum, and means for discharging streams of liquid candy onto the drum while it is rotating said last mentioned means including a tiltable container and swinging fingers capable of swinging independently of the container.

2. A candy spinning and weaving machine, comprising a drum, means for discharging continuous streams of liquid candy onto the drum, and means for simultaneously rotating the drum and moving the same laterally whereby a weaving effect is secured.

3. In a candy spinning and weaving machine, a drum formed with a smooth peripheral surface, and a plurality of transversely positioned bars engaging said surface and extending from one side of the drum to the other, said bars acting as anchoring means for the candy spun and woven on the drum.

4. In a candy spinning and weaving machine, a drum for receiving the spun and woven candy, a container for containing the liquid candy before it is spun, a plurality of fingers arranged adjacent the container for discharging liquid candy in streams onto the drum, and means for causing the liquid candy as it leaves the container to be discharged against said fingers.

5. In a candy spinning and weaving machine, a container for containing liquid candy, means for heating the container and candy therein, and means for discharging the candy from the container in a plurality of streams, said last mentioned means including fingers swingable independent of said container.

6. In a candy spinning and weaving machine, a container for receiving liquid candy, said container being provided with a plurality of comparatively small discharge spouts, a finger arranged adjacent each discharge spout, and means for maintaining the fingers normally adjacent the spouts and in a substantially vertical position.

7. In a candy spinning and weaving machine, a container for receiving liquid candy provided with a plurality of discharge spouts, a spinning structure pivotally mounted on said container and formed with a finger extending into the path of flow of candy discharged through said spouts, and weights connected with said spinning structure for normally maintaining the same in a vertical position and adjacent said spouts.

8. In a candy spinning and weaving machine, a container for containing liquid candy formed with a plurality of discharge spouts, a weaving finger arranged adjacent each spout, a weight for maintaining said fingers normally in a vertical position when adjacent said spouts, a rotatable drum for receiving the candy from said fingers, and means for tilting said container more and more as the liquid candy is discharged therefrom.

9. In a candy spinning and weaving machine, a manually actuated rotatable drum, a container for receiving liquid candy provided with a plurality of discharge spouts, means for supporting a container above the drum so that the candy from the discharge spouts will fall onto the drum, a weaving finger arranged adjacent each of the spouts for receiving the candy from the spouts and directing the same to the drum, means for pivotally supporting said container above said drum, a ligament connected with said container near one edge, and a manually actuated rotatable member for pulling said ligament to cause the container to tilt more and more as the liquid candy therein is discharged through said spouts.

THEODORE BOSSHARD.